US009618678B1

(12) United States Patent
Tickner et al.

(10) Patent No.: US 9,618,678 B1
(45) Date of Patent: Apr. 11, 2017

(54) WAVEGUIDE LIGHT FIXTURES

(71) Applicants: Jerold Alan Tickner, Newnan, GA (US); Kevin Roy Harpenau, Peachtree City, GA (US); Russell Bryant Green, Douglasville, GA (US)

(72) Inventors: Jerold Alan Tickner, Newnan, GA (US); Kevin Roy Harpenau, Peachtree City, GA (US); Russell Bryant Green, Douglasville, GA (US)

(73) Assignee: Cooper Technologies Company, Houston, TX (US)

( * ) Notice: Subject to any disclaimer, the term of this patent is extended or adjusted under 35 U.S.C. 154(b) by 186 days.

(21) Appl. No.: 14/061,328

(22) Filed: Oct. 23, 2013

Related U.S. Application Data

(60) Provisional application No. 61/717,386, filed on Oct. 23, 2012.

(51) Int. Cl.
*F21V 7/04* (2006.01)
*B60Q 1/06* (2006.01)
*F21V 29/00* (2015.01)
*F21V 7/00* (2006.01)
*F21V 8/00* (2006.01)

(52) U.S. Cl.
CPC .......... *G02B 6/0021* (2013.01); *G02B 6/0085* (2013.01)

(58) Field of Classification Search
CPC .......... F21K 9/52; F21V 7/0058; F21V 13/04; F21V 29/83; F21V 29/773; F21V 31/005; F21V 23/004; F21V 23/009; F21V 7/0008; F21V 7/0091; F21V 15/01; G02B 6/0023; G02B 6/0068; G02B 6/0021; G02B 6/0006; G02B 5/0011; G02B 6/0011; G02B 6/0085; G02B 6/0091; F21Y 2103/022; F21S 8/04
USPC .......................................... 362/373
See application file for complete search history.

(56) References Cited

U.S. PATENT DOCUMENTS

| 6,082,871 | A  | * | 7/2000  | Yeh ........................... F21S 8/04 362/147 |
| 7,524,089 | B2 | * | 4/2009  | Park ............................. 362/294 |
| 7,611,264 | B1 | * | 11/2009 | Chang et al. ............ 362/249.02 |
| 7,708,452 | B2 | * | 5/2010  | Maxik et al. ................ 362/650 |
| 7,862,210 | B2 | * | 1/2011  | Zhang .................... F21V 15/01 362/249.02 |
| 8,192,049 | B2 | * | 6/2012  | Hyun ........................ F21S 8/02 362/241 |
| 2009/0086480 | A1 | * | 4/2009 | Chen ..................... F21V 7/0008 362/235 |
| 2009/0097241 | A1 | * | 4/2009 | Xu ............................ F21K 9/00 362/234 |
| 2009/0129121 | A1 | * | 5/2009 | Yoneda .............. G01N 21/8806 362/628 |

(Continued)

FOREIGN PATENT DOCUMENTS

WO    WO 2011129170 A1  *  10/2011

*Primary Examiner* — Peggy Neils
*Assistant Examiner* — Erin Kryukova
(74) *Attorney, Agent, or Firm* — King & Spalding LLP

(57) ABSTRACT

A light emitting diode (LED) light fixture is described. The LED light fixture can include a wave guide having an aperture that traverses therethrough. The LED light fixture can also include at least one LED disposed adjacent to the aperture in the wave guide. The LED light fixture can further include a LED driver electrically coupled to the at least one LED. The LED light fixture can also include a heat sink thermally coupled to the at least one LED.

16 Claims, 10 Drawing Sheets

(56) References Cited

U.S. PATENT DOCUMENTS

| | | | |
|---|---|---|---|
| 2009/0147518 A1* | 6/2009 | Shuai et al. | 362/249.02 |
| 2009/0147525 A1* | 6/2009 | Lai | 362/297 |
| 2009/0257234 A1* | 10/2009 | Zheng et al. | 362/373 |
| 2009/0290343 A1* | 11/2009 | Brown et al. | 362/235 |
| 2009/0323331 A1* | 12/2009 | Louh | 362/235 |
| 2011/0063855 A1* | 3/2011 | Vissenberg | G02B 6/0021 362/311.12 |
| 2011/0107587 A1* | 5/2011 | Kolb | 29/592.1 |
| 2012/0014128 A1* | 1/2012 | Lin | 362/580 |
| 2013/0286667 A1* | 10/2013 | Sampsell | F21S 8/026 362/368 |
| 2014/0301076 A1* | 10/2014 | Ter-Hovhannisyan | 362/235 |

\* cited by examiner

WAVEGUIDE LIGHT FIXTURES

CROSS-REFERENCE TO RELATED APPLICATIONS

This application claims priority under 35 U.S.C. §119 to U.S. Provisional Patent Application Ser. No. 61/717,386, titled "Stingray Waveguide Light Fixtures" and filed on Oct. 23, 2012, the entire contents of which are hereby incorporated herein by reference.

The present application is related to U.S. patent application Ser. No. 13/795,631 entitled "Light-Emitting Diode Wave Guide Down Light Retrofit Fixtures" filed on Mar. 12, 2013, the entire contents of which are hereby incorporated herein by reference.

TECHNICAL FIELD

Embodiments described herein relate generally to light emitting diode (LED) fixtures, and more particularly to systems, methods, and devices for waveguide (also called wave guide) LED fixtures.

BACKGROUND

People with light fixtures at times replace one or more of these fixtures. Replacing a light fixture often requires decoupling the old fixture both mechanically and electrically and coupling the new fixture both mechanically and electrically in the area that the fixture will be positioned. In addition, a new installation of a light fixture into a vacant receptacle (e.g., a covered and unused junction box in a ceiling for a ceiling fan and/or light source) requires electrical and mechanical work.

Many consumers are not comfortable with personally handling electrical issues, which can result in them putting off installation and/or replacement of the fixture or having to wait and hire an experienced electrician to help them with the new installation and/or replacement. Replacement of the fixture can also entail painting or repairing a wall or other surface that the replacement fixture is being coupled to and can result in other additional expenses. In addition, many light fixtures use lighting technologies that are not as efficient and/or effective as LED-based lighting systems.

SUMMARY

In general, in one aspect, the disclosure relates to a light-emitting diode (LED) light fixture. The LED light fixture can include a wave guide having an aperture that traverses therethrough. The LED light fixture can also include at least one LED disposed adjacent to the aperture in the wave guide. The LED light fixture can further include a LED driver electrically coupled to the at least one LED. The LED light fixture can also include a heat sink thermally coupled to the at least one LED.

These and other aspects, objects, features, and embodiments will be apparent from the following description and the appended claims.

BRIEF DESCRIPTION OF THE DRAWINGS

The drawings illustrate only example embodiments of waveguide light fixtures and are therefore not to be considered limiting of its scope, as waveguide light fixtures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1A:
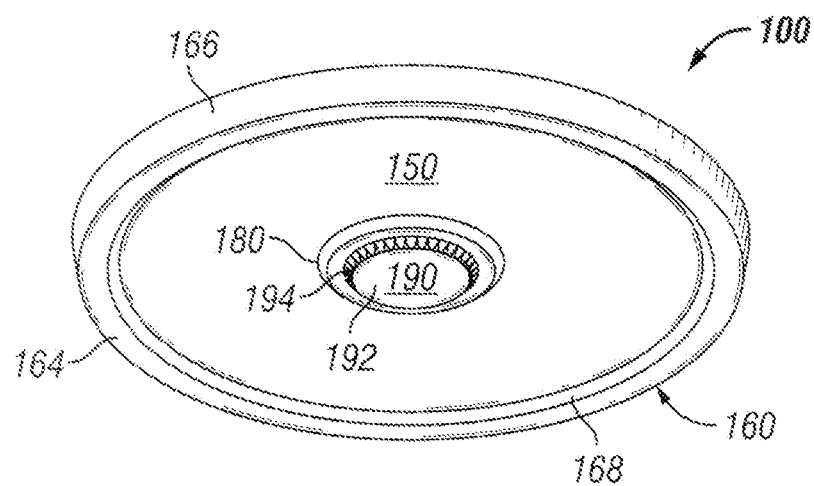
FIGS. 1A-1D show various views of a housing assembly of an example center-fired waveguide LED light fixture in accordance with certain example embodiments.

The example embodiments discussed herein are directed to systems, apparatuses, and methods of waveguide light fixtures (also called waveguide LED light fixtures). Such waveguide light fixtures can be used for retrofitting existing fixtures with LED wave guide down light fixtures. As used herein, "existing fixture" can mean an existing light fixture that is being replaced by an example waveguide light fixture. In addition, or in the alternative, "existing fixture" can mean a vacant receptacle that can receive an example waveguide light fixture, but that currently does not have a lighting fixture that is being replaced.

Such existing fixtures can have one or more of a number of types of socket into which one or more light sources are electrically and mechanically coupled. Examples of a socket can include, but are not limited to, an Edison screw base of any diameter (e.g., E26, E12, E 14, E39), a bayonet style base, a bi-post base, a bi-pin connector base, a wedge base, and a fluorescent tube base. A light source of the existing fixture can electrically and mechanically couple to the socket and can be of a light source type that corresponds to the socket. Examples of light source types of the light source can include, but are not limited to, incandescent lamps, LEDs, halogen lamps, G10/GU10, G9/GU9, AR111/PAR36, T3, MR-11, and MR-16. If the light source of the existing fixture is a LED, the LED can be of one or more of a number of types of LED technology, including but not limited to discrete LEDs, LED arrays, chip-on-board LEDs, edge lit LED panels, and surface mounted LEDs.

Such existing fixtures can be mounted in, or can be, a junction box (also called a j-box), a recessed luminaire, or some other base for the fixture. In certain example embodiments, the junction box, recessed luminaire, or other base is mounted in a ceiling or other surface so that the light emitted by the fixture is directed downward (down light), away from the ceiling or other surface. Such a base for an existing fixture can be electrically coupled to a power source to provide power and/or control to the light fixture. The power source can provide the existing fixture with one or more of a number (and/or a range) of voltages, including but not limited to 120 V alternating current (AC), 110 VAC, 240 VAC, 24 V direct current (DC), and 0-10 VDC.

Such existing fixtures can be of any size and/or shape, and can have any number of sockets and/or wires. Such existing fixtures can be located indoor and/or outdoors and can be mounted to a surface (e.g., wall, ceiling, pillar), be part of a lamp, or be used with any other suitable mounting instrument where a down light is used. Such existing fixtures can be used in residential, commercial, and/or industrial applications. Such existing fixtures can operate from a manual device (e.g., on/off switch, dimming switch, pull chain), a photocell, a timer, and/or any other suitable mechanism.

When an example waveguide LED light fixture is retrofitted over an existing fixture, the base (e.g., the junction box, the recessed luminaire) of the existing fixture remains as part of the waveguide LED light fixture, while the remaining components of the existing fixture are removed. For example, the socket, the lens, and the light source of the existing fixture can be removed. In certain example embodiments, at least the light source of the existing fixture is replaced by the example waveguide LED light fixture. In certain example embodiments, the base of the existing fixture is removed and/or modified by the example waveguide LED light fixture.

When an example waveguide LED light fixture is installed, one or more of a number of electrical and/or mechanical standards can apply. For example, if the example waveguide LED light fixture is installed in a junction box, the National Electric Code (NEC) requires that there is at least two cubic inches of space per wire (although multiple ground wires are only counted once). Further, Underwriters' Laboratory (UL) endorses this standard of the NEC. The example waveguide LED light fixtures described herein are designed to comply with such standards.

The shape of the example waveguide LED light fixtures described herein is circular, but the example waveguide LED light fixtures can have one or more of a number of other shapes, including but not limited to square, triangular, rectangular, hexagonal, oval, and random.

Example embodiments for retrofitting existing fixtures with waveguide LED light fixtures will be described more fully hereinafter with reference to the accompanying drawings, in which example embodiments of retrofitting existing fixtures with waveguide LED light fixtures are shown. Retrofitting existing fixtures with waveguide LED light fixtures may, however, be embodied in many different forms and should not be construed as limited to the example embodiments set forth herein. Rather, these example embodiments are provided so that this disclosure will be thorough and complete, and will fully convey the scope of retrofitting existing fixtures with waveguide LED light fixtures to those or ordinary skill in the art. Like, but not necessarily the same, elements (also sometimes called components) in the various figures are denoted by like reference numerals for consistency. Terms such as "first," "second," "top," and "bottom" are used merely to distinguish one component (or part of a component) from another. Such terms are not meant to denote a preference or a particular orientation.

Figure 1B:
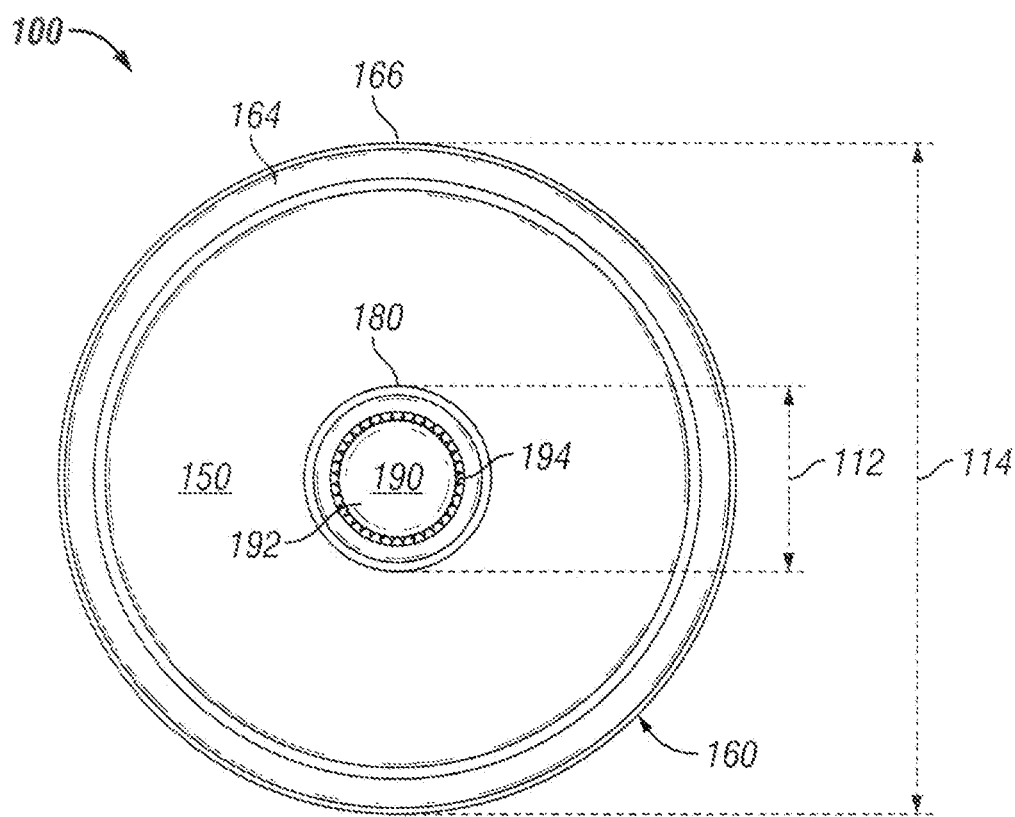
Figure 1C:
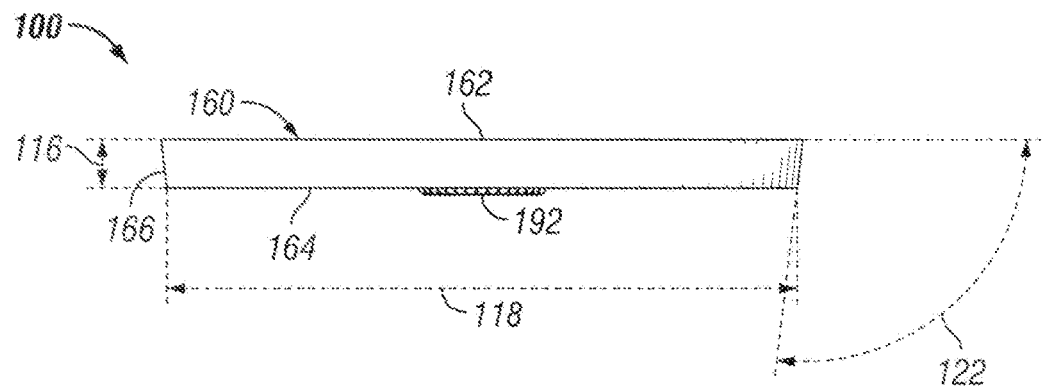
Figure 1D:
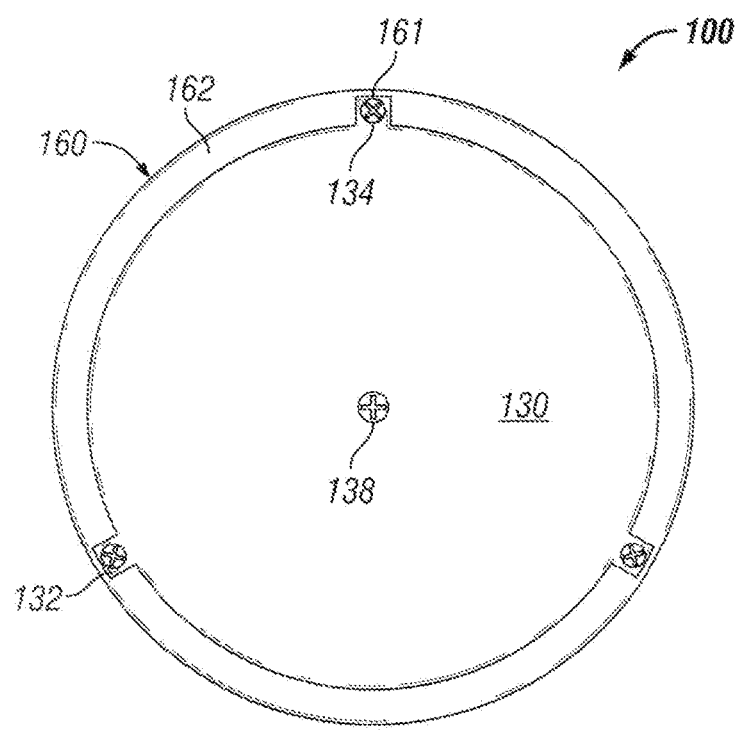

FIGS. 1A-1D show a various views of a housing assembly 100 of an example center-fired waveguide LED light fixture in accordance with certain example embodiments. Specifically, FIG. 1A shows a perspective bottom-side view of the housing assembly 100. FIGS. 1B-1D show a bottom, side, and top view, respectively, of the housing assembly 100. In one or more example embodiments, one or more of the components shown in FIGS. 1A-1D may be omitted, repeated, and/or substituted. Accordingly, embodiments of an integral connector end should not be considered limited to the specific arrangements of components shown in FIGS. 1A-1D.

Referring now to FIGS. 1A-1D, the example housing assembly 100 shown in FIGS. 1A-1D includes a trim 160, a sealing plate 130, a wave guide 150 (which can also be spelled as a single word "waveguide"), a heat sink 180, and a cover plate 190. In certain example embodiments, the heat sink 180 is mechanically and thermally coupled to an aperture in the approximate center of the wave guide 150. The heat sink 180 dissipates heat generated by the wave guide 150, the LED modules (not shown in FIGS. 1A-1D), and/or LED driver (not shown in FIGS. 1A-D). The heat sink 180 can include one or more features (e.g., lips, protrusions, fins, fans, synthetic jets) for active or passive cooling of the fixture. For example, as shown in more detail with respect to FIG. 2, the heat sink 180 can have a lower portion that has a larger outer perimeter than an upper portion, which allows the lower portion to help secure one or more other components (e.g., the wave guide 150) in place. The heat sink 180 can be made of one or more of a number of thermally conductive materials, including but not limited to die cast aluminum, ceramic, and thermal plastic.

The heat sink 180 (as well as the rest of the housing assembly 100) can be made from a single piece (as from a cast fixture) or made from multiple pieces that are mechanically coupled to each other. The heat sink 180 can have one or more of a number of different shapes and/or dimensions (e.g., height, diameter, thickness, width). For example, the bottom profile of the heat sink 180 can be circular, as shown in FIGS. 1A and 1B. In such a case, the bottom profile of the heat sink 180 can have a diameter 112. Such a diameter 112 can be, for example, 2 inches. Additional features of the heat sink 180 are described below with respect to FIG. 2.

In certain example embodiments, the cover plate 190 is mechanically coupled to the heat sink 180. The cover plate 190 can be mechanically coupled to the heat sink 180 in one or more of a number of coupling means, including but not limited to mating threads, a snap fitting, and a slotted fitting. The cover plate 190 and/or the heat sink 180 can include one or more features (e.g., threads, protrusions, slots) that allow the cover plate 190 to be mechanically coupled to the heat sink 180. The cover plate 190 can be ornamental (to cover some or all of the bottom portion of the heat sink 180) and/or functional.

As an example of an ornamental feature of the cover plate 190, the outer surface 192 of the cover plate 190 can be flat, smooth, and have one or more of a variety of colors. Such an ornamental feature can be used to hide some or all of the heat sink 180 and/or any connecting features (e.g., additional fastening and/or coupling devices) from view. As an example of a functional feature of the cover plate 190, the cover plate 190 can have one or more vent holes 194 that allow air from the heat sink 180 to flow to the ambient air outside the housing assembly 100. The cover plate 190 can be made of one or more of a number of materials, including but not limited to aluminum, plastic, rubber, and nylon.

The cover plate 190 can have one or more of a number of different shapes and/or dimensions (e.g., height, diameter, thickness, width). For example, the profile of the outer surface 192 of the cover plate 190 can be the same shape as the bottom profile of the heat sink 180. In the example shown in FIGS. 1A and 1B, the profile of the outer surface 192 of the cover plate 190 is circular. In such a case, the profile of the outer surface 192 of the cover plate 190 can have a diameter that can be larger than, the same as, or smaller than the diameter 112 of the bottom profile of the heat sink 180.

In certain example embodiments, the trim 160 has a number of features. Such features can be used to mechanically couple one or more other components (e.g., wave guide 150) of the housing assembly 100 to the trim 160. Two such features can be, for example, a lip 162 that is disposed along the top side (i.e., the side facing toward the mounting surface, such as a ceiling) of the trim 160, and one or more recesses 161 and apertures (hidden from view) within the recesses 161 disposed along the lip 162. The lip 162, apertures, and recesses 161 are examples of features that can be used to mechanically couple the sealing plate 130 to the trim 160. The lip 162 can also have a width (distance between the inner perimeter and the outer perimeter) or thickness.

The sealing plate 130 encases one or more components of the housing assembly 100 within the trim 160. The sealing plate 130 can have a flat outer surface or an outer surface with a profile that is substantially the same as the lower surface of the mounting plate, described below. The sealing plate 130 can also have a shape that is substantially the same as the shape formed by the lip 162 and/or the perimeter of the top portion of the trim 160. The length of the outer perimeter of the sealing plate 130 can be substantially the same as or slightly less than the inner perimeter of the lip 162, so that the sealing plate 130 can fit within the lip 162.

To help properly align the sealing plate 130 with the trim 160, the sealing plate 130 can include a number of protrusions 132 that extend outward along one or more sides of the sealing plate 130. Such protrusions 132 can correspond in number, shape, and size (e.g., width, thickness) with the recesses 161 disposed along the lip 162 of the trim 160. In such a case, one or more fastening devices 134 (e.g., a screw, a bolt) can extend through an aperture that traverses a protrusion 132 and at least partially traverses an aperture in the recess 161. In addition, or in the alternative, other coupling features can be used to mechanically couple the sealing plate 130 to the trim 160. For example, each recess 161 can have a portion that extends horizontally at the bottom of the recess 161 and receives the protrusions 132 when the sealing plate 130 is rotated toward the direction of the horizontally extending portion of the recess 161.

The sealing plate 130 can also have one or more features that allow the sealing plate 130 to mechanically couple to one or more other components of the housing assembly 100. For example, an aperture (hidden from view by fastening device 138) positioned in the approximate center of the sealing plate 130 can traverse the sealing plate 130 and allow the fastening device 138 (e.g., a screw, a bolt) to traverse therethrough. The sealing plate 130 can be made of one or more of a number of materials, including but not limited to aluminum, plastic, rubber, and nylon.

In certain example embodiments, an optional sealing member (e.g., a gasket, an o-ring) (not shown) is disposed between the bottom side of the sealing plate 130 and the trim 160 (or some other component within the housing assembly 100). The sealing member can be used to prevent or reduce an amount of moisture, dirt, and other such elements from entering the housing assembly 100. Similarly, an optional sealing member (not shown) can be disposed between the cover plate 190 and the heat sink 180 and/or between the heat sink 180 and the wave guide 150. Those skilled in the art will appreciate that one or more other sealing members can be disposed between two or more components of the housing assembly 100.

Referring again to the trim 160, the trim 160 can have other features, as well. As an example, as shown in FIG. 1B, the outer side edge 166 of the trim 160 can be tapered to form an angle 122 relative to the plane formed by the lip 162. The angle 122 can be perpendicular, acute, or obtuse. As an example, the angle 122 can be 96°. In such a case, the perimeter of the bottom of the outer side edge 166 can be different than the perimeter of the top of the outer side edge 166. Because the front and rear profiles of the trim 160 are circular, the perimeter of the bottom of the outer side edge 166 and the perimeter of the top of the outer side edge 166 can be compared in terms of diameter. If the front and/or rear profiles have a non-circular shape, than some other suitable measurement can be used. For the example shown, the diameter 114 of the top of the outer side edge 166 and the diameter 118 of the bottom of the outer side edge 166 can be different. In this case, the diameter 114 of the top of the outer side edge 166 can be approximately 7.25 inches, and the diameter 118 of the bottom of the outer side edge 166 can be approximately 7.134 inches.

The trim 160 can also have an inner side edge 168, which can be perpendicular to or non-perpendicular to the plane formed by the bottom edge 164. In certain example embodiments, the plane formed by the bottom edge 164 is substantially parallel to the plane formed by the lip 162. Further, the inner side edge 168 can be shorter than the outer side edge 166, which can allow for a shelf and/or other feature to secure the wave guide 150 and/or other component of the housing assembly 100 to the trim 160.

Consistent with the low profile design, the height 116 of the trim 160 can be significantly less than the length (e.g., diameter 114) of the trim 160. For example, the height 116 of the trim 160 can be approximately 0.553 inches. The trim 160 can be made of one or more of a number of materials, including but not limited to aluminum, plastic, rubber, and nylon.

Figure 2:
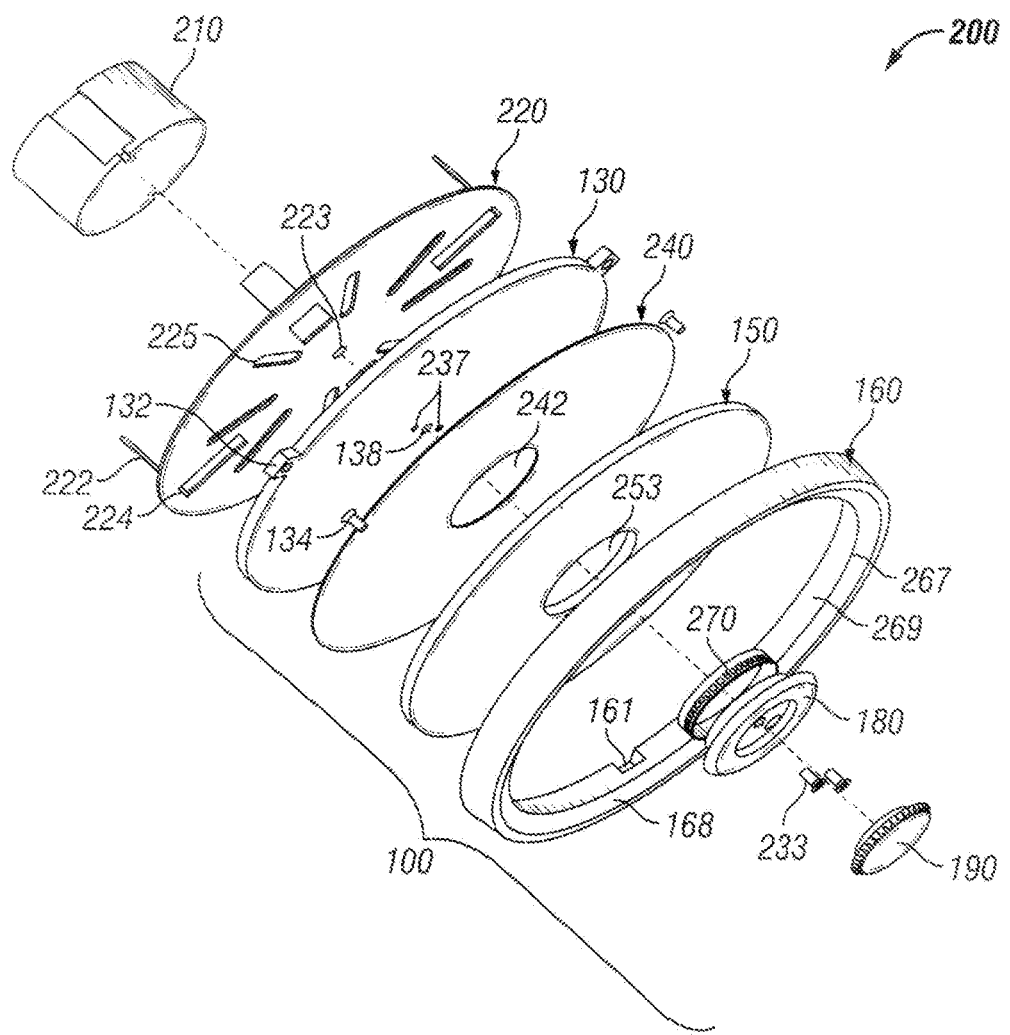
FIG. 2 shows an exploded perspective view of an example center-fired waveguide LED light fixture in accordance with certain example embodiments.
Figure 3B:
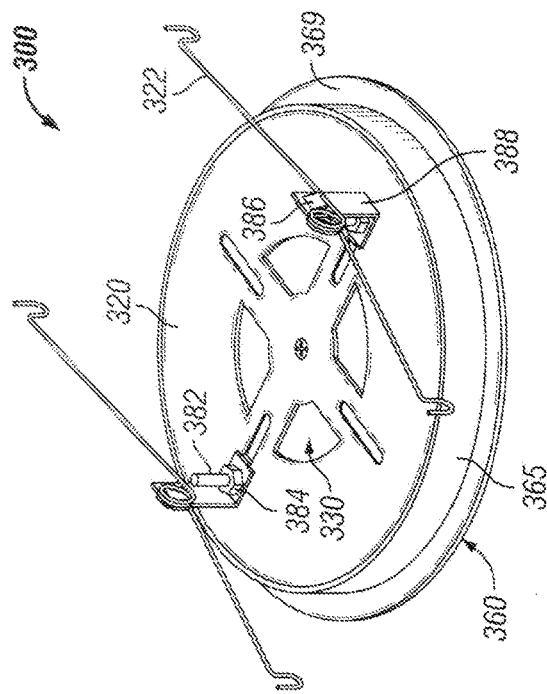
FIGS. 3A-3E show various views of an alternative example center-fired waveguide LED light fixture in accordance with certain example embodiments.
Figure 3C:
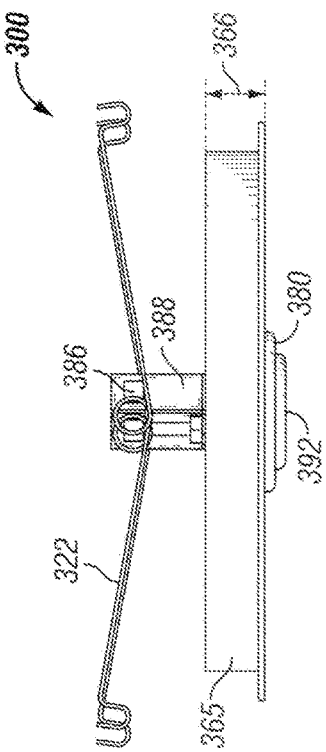
Figure 3A:
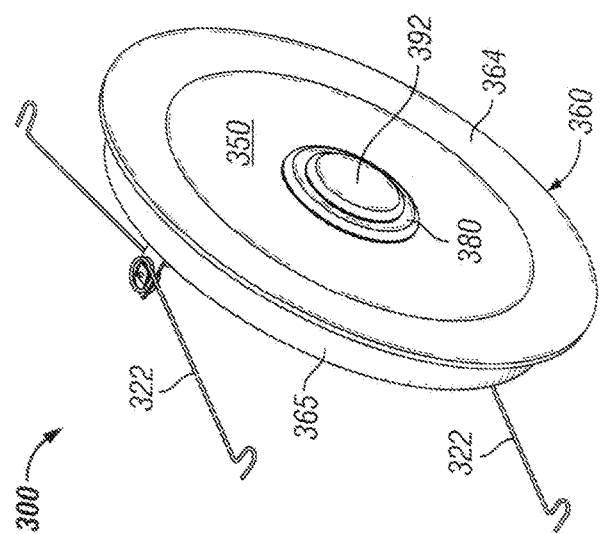
Figure 3D:
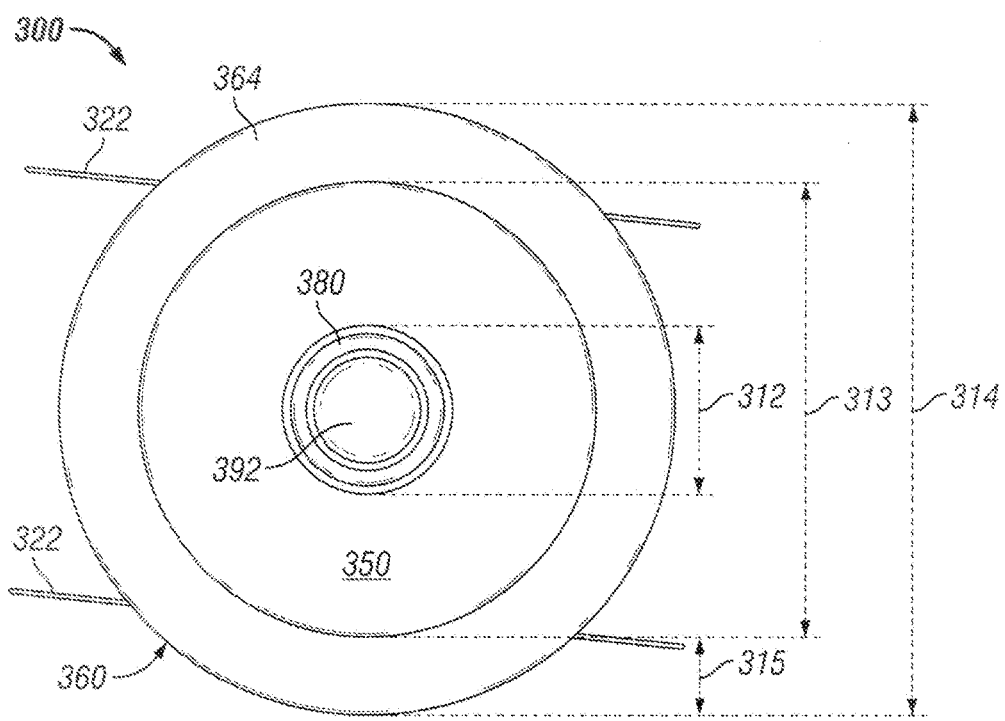
Figure 3E:
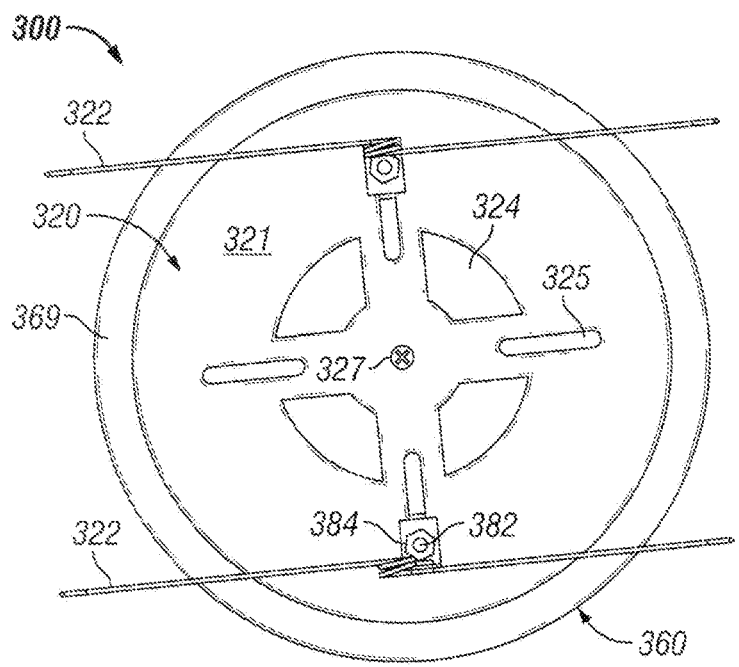

FIG. 2 shows an exploded perspective bottom-side view of an example center-fired waveguide LED light fixture 200, which includes the housing assembly 100 described above with respect to FIGS. 1A-D, in accordance with certain example embodiments. Specifically, the example center-fired waveguide LED light fixture 200 of FIG. 2 mounts within a recessed luminaire and/or a junction box. In one or more embodiments, one or more of the components shown in FIG. 2 may be omitted, repeated, and/or substituted. Accordingly, embodiments of a center-fired waveguide LED light fixture should not be considered limited to the specific arrangement of components shown in FIG. 2.

Referring to FIGS. 1A-2, the mounting plate 220 is used secure the housing assembly 100 to a mounting surface (e.g., wall, ceiling, stud) and/or a mounting receptacle (e.g., junction box, recessed luminaire). The mounting plate 220 can have any shape, size, and/or configuration to secure the housing assembly 100 to a mounting surface and/or mounting receptacle. As an example, the mounting plate 220 shown in FIG. 2 can have substantially the same shape and/or be substantially the same size as the sealing plate 130, the lip 162 of the trim 160, and/or one or more other components of the fixture 200. In certain example embodiments, the mounting plate 220 has a number of apertures 223, 224, 225 that traverse the thickness of the mounting plate 220.

An aperture in the mounting plate 220 can be a hole (e.g., aperture 223), a slot 225 having a narrow, straight segment, a slot 224 having a wide, straight segment, some other suitable aperture that traverses at least a portion of the mounting plate 220, or any combination thereof. For example, the mounting plate 220 shown in FIG. 2 can be mechanically coupled to the housing assembly 100 using one or more fastening devices 138 (e.g., screw, bolt) that traverse an aperture 223 in the mounting plate 220 and at least part of a corresponding aperture in the sealing plate 130 to couple the mounting plate 220 to the housing assembly 100.

As another example, one or more slots 224, 225 disposed on the mounting plate 220 can be used to adjustably fasten one or more brackets 222 to the mounting plate 220. A bracket 222 can be used to mechanically couple the waveguide LED light fixture 200 to a recessed luminaire. Each bracket 222 can include one or more features that allow the bracket 222 to couple to the recessed luminaire and/or one or more features within the recessed luminaire.

In certain example embodiments, one or more portions of the bracket 222 is aligned with one of the slots 224, 225 in the mounting plate 220. In such a case, one or more fastening devices can be used to secure the bracket 222 to the mounting plate 220. For example, an extended bolt can traverse a portion of a slot 224, 225 in the mounting plate 220 and extends toward the top side of the bracket 222. In such a case, a nut can be threadably coupled to the extended bolt and tightened against the bracket 222 to secure the bracket 222 to the mounting plate 220.

The fastening devices (e.g., extended bolt, nut) used to couple the bracket 222 to the mounting plate 220 can be loosened and/or removed periodically by a user. In such a case, the bracket 222 can be moved to properly fit within the recessed luminaire. For example, the bracket 222 can slide along one or more slots 224, 225 in the mounting plate 220 when the nut is loosened. When the bracket 222 is positioned in the proper place on the mounting plate 220 for the size (e.g., 4 inches, 5 inches, 6 inches) of the recessed luminaire, then the nut can be tightened to keep the bracket 222 in place.

The mounting plate 220 and the bracket 222 can be made of one or more of a number of materials, including but not limited to plastic, metal, rubber, and ceramic. Further, various features of the bracket 222 (e.g., wings, tabs, cutout features) can be made from a single piece (as from a mold) and/or can be separate pieces that are mechanically coupled to each other using one or more coupling methods, including but not limited to epoxy, welding, rivets, compression fittings, and fastening devices.

In addition, in certain example embodiments, the LED driver 210 is mechanically coupled to the mounting plate 220. For example, the LED driver 210 can be mounted on the top surface of the mounting plate 220. The LED driver 210 can be mounted to the mounting plate 220 using one or more of a number of fastening devices, including but not limited to clips, brackets, screws, bolts, mating threads, and rivets. The LED driver 210 can be mounted in substantially the center of the mounting plate 220. In addition, if there are multiple brackets 222, the brackets 222 can be positioned substantially equidistantly, in some other ordered fashion, or randomly around the LED driver 210 and/or the center of the mounting plate 220.

The LED driver 210 can include one or more of a number of components (e.g., transformer, resistor, capacitor, integrated circuit) that can be discrete components, components integrated with a circuit board, and/or functions performed by components that are programmed into a hardware processor. The LED driver 210 receives power and/or control information from the power source (via or a switch or control device communicably coupled to the LED driver 210) of the existing fixture, converts the power and/or control to a corresponding signal (e.g., voltage, current), and sends the corresponding signal to the one or more LED modules 270 to control the operational characteristics of the LED modules 270. When the LED driver 210 is mounted on the top surface of the mounting plate 220 or at some other location outside the housing assembly 100, the LED driver 210 is enclosed so that none of the components of the LED driver 210 is exposed.

Figure 4:
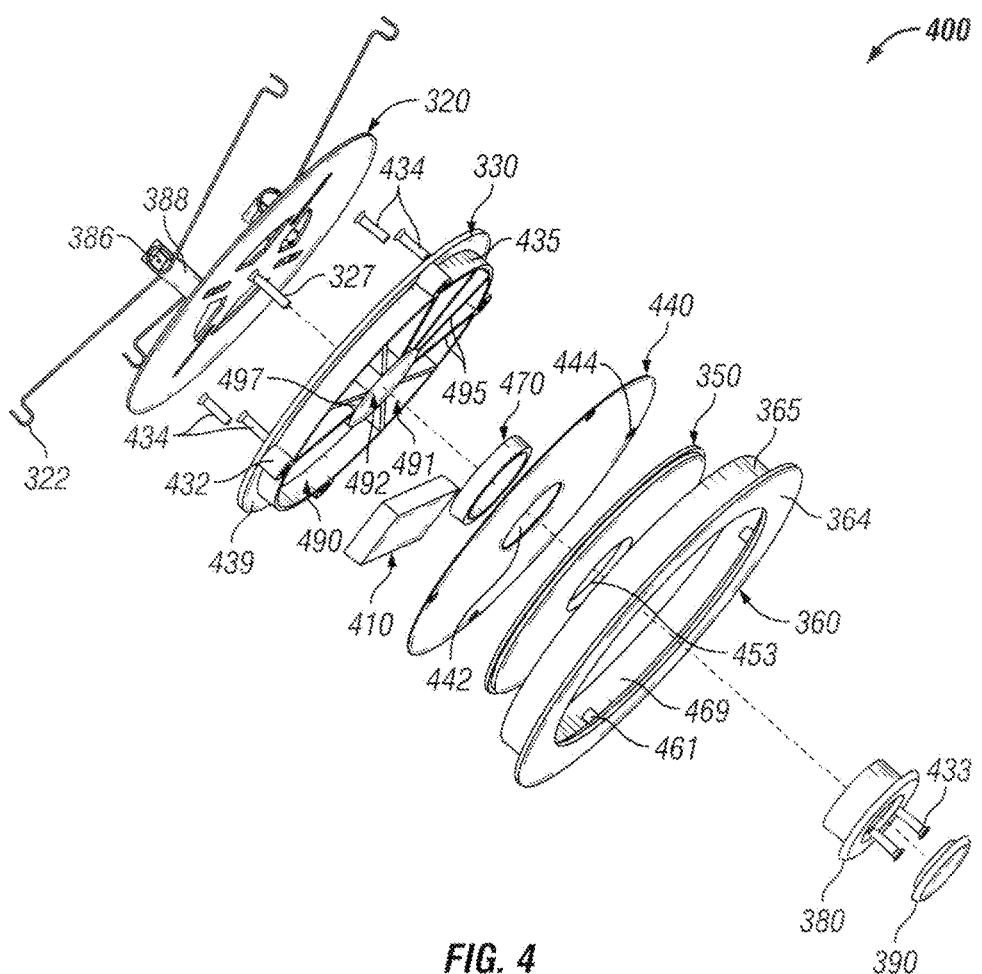
FIG. 4 shows an exploded perspective bottom-side view of the alternative example center-fired waveguide LED light fixture of FIGS. 3A-E in accordance with certain example embodiments.

In certain example embodiments, the LED driver 210 is located inside the housing assembly 100. In such a case, as shown in FIG. 4 below, the LED driver 210 can be enclosed or have the components of the LED driver 210 exposed, but enclosed from the external environment by one or more components of the housing assembly 100. Further, in such a case, the profile of the LED driver 210 can be lower and/or the height of the housing assembly 100 can be higher. Alternatively, the LED driver 210 can be located remotely from the waveguide LED light fixture 200 using wired and/or wireless technology.

The reflector 240 of the housing assembly 100 can be positioned between the bottom side of the sealing plate 130 and the top side of the wave guide 150. In certain example embodiments, when the reflector 240 is a separate component of the housing assembly 100, the reflector 240 substantially abuts the top side of the wave guide 150. Alternatively, the reflector 240 can be part of (e.g., a coating) the top surface of the reflector 240. The reflector 240 can also maintain a minimal air gap with or substantially abut the bottom side of the sealing plate 130. In any case, one or more recessed borders 267 can be incorporated into the inner surface 269 along some or all of the perimeter of the trim 160 to accommodate the wave guide 150, the reflector 240, and/or the sealing plate 130. The recessed border 267 can have any of a number of depths, including a depth that is substantially equal to the height of the corresponding component that is secured in the recessed border 267.

In certain example embodiments, the example reflector 240 is positioned above the wave guide 150 and reflects light transmitted through and received from the wave guide 150 back through the wave guide 150 towards the area to be illuminated. In certain example embodiments, the reflector 240 is made of and/or coated with a highly reflective material. For example, the reflector 240 can be made of a white optic material or alternatively can be made of a metallic material and painted with a white high-reflectance paint. For a center-fired waveguide LED light fixture 200, as shown in FIG. 2, the reflector 240 and the wave guide 150 can each include an aperture 242 and an aperture 253, respectively, that aligns with the top portion of the heat sink 180. For example, the aperture 242 of the reflector 240 and the aperture 253 of the wave guide 150 can be positioned substantially in the center of the reflector 240 and the wave guide 150, respectively. In such a case, the aperture 242, 253 can have substantially the same shape as the top portion of the heat sink 180 and be of a perimeter that is slightly larger than the perimeter of the heat sink 180 with the LED modules 270.

In certain example embodiments, the example housing assembly 100 can include a diffuser (not shown). If included, the diffuser can be a separate component of the housing assembly 100. Alternatively, the diffuser can be part of (e.g., a coating) the bottom surface of the wave guide 150. The diffuser (if included), the wave guide 150, and the reflector 240 have substantially the same shape. The diffuser (if optionally included) can include a first side portion that includes at least a portion that is disposed against the wave guide 150 and a second, opposing side portion that faces an area to be illuminated. When the diffuser is not included with, or is integrated with, the housing assembly 100, the wave guide 150 can be viewed from the area being illuminated.

In certain example embodiments, the diffuser is opaque and prevents direct viewing of the wave guide 150 while also helping to more evenly distribute (or otherwise control) light generated by the LEDs of the LED modules 270. The example diffuser can be made of one or more of a number of materials, including but not limited to plastic, nylon, and a Mylar® film that is adhered to the second (bottom) side of the wave guide 150. (Mylar is a registered trademark of DuPont Teijin Films US Limited Partnership of Wilmington, Del.)

In addition, or in the alternative, the example wave guide 150 can include a lens (not shown). A lens can be positioned below (either coupled to or adjacent to) the wave guide 150, and the lens can be mechanically coupled to one or more portions of the heat sink 180 and/or the trim 160. A lens can be of any suitable size, color, thickness, texture, opacity, and shape. A lens described herein can also be made of one or more of a number of suitable materials, including but not limited to plastic, such as acrylic, and glass. A lens may be configured to manipulate light emitted by the LEDs of the LED modules 270 in one or more of a number of ways, including but not limited to filtering, diffusion, reflection, and refraction. The example wave guide 150 can be disposed between the diffuser and the reflector 240. If a diffuser is not included, a portion of the perimeter of the wave guide 150 can be disposed against the recessed portion 267 and the reflector 240.

In certain example embodiments, the LED modules 270 of the housing assembly 100 are disposed around all or a portion of the top portion of the heat sink 180. In such a case, the LED modules 270 are thermally coupled to at least a portion of the heat sink 180. As explained below, LED module 270 can include at least one LED and mounted on a printed circuit board (PCB) or other mounting board.

The example wave guide 150 can have at least one edge that is disposed up against (or proximate to) the LED modules 270 to receive the light being emitted by the LEDs of the LED modules 270 and distribute that light across the wave guide 150 to create a generally consistent light level across the wave guide 150. In FIG. 2, for the center-fired waveguide LED light fixture 200, the edge that defines the aperture 253 in the wave guide 150 is disposed up against the LED modules 270.

In certain example embodiments, the wave guide 150 abuts the LED modules 270 in order to receive an increased amount of light output by the LEDs of the LED modules 270. In certain example embodiments, the wave guide 150 is made of acrylic and includes etchings between the top surface and the bottom surface to help distribute the light received from the LED modules 270 evenly or substantially evenly across the surface area of the wave guide 150. In certain example embodiments, the wave guide 150 also includes an etched surface along the portion of the wave guide 150 facing the area to be illuminated to reduce the reflectivity of the outer surface of the wave guide 150.

The wave guide 150 can be of any shape, thickness, and/or other characteristic suitable to be positioned within the housing assembly 100. For example, the wave guide 150 of FIG. 2 has a circular shape. Light generated by the LEDs of the LED modules 270 can be fed through the aperture 253 in the wave guide 150 from one direction (at one point along the perimeter of the aperture 253), from two directions (at two points along the perimeter of the aperture 253), or from more than two directions. The wave guide 150 can include, and/or be proximally located with respect to, one or more LEDs of the LED modules 270 that can emit light in one or more colors. The LEDs can also be of any shape, size, and brightness. The brightness and/or other light distribution of the light emitted by the LEDs can be constant or variable along the wave guide 150.

In certain example embodiments, each LED module 270 includes a PCB mounting platform and one or more LEDs. In such a case, an example PCB mounting platform can have an outer surface that has one or more of a number of shapes. Such shapes can include, but are not limited to, an octagon, a pentagon, a heptagon, a nonagon, a decagon, a hexagon, a circle, an oval, and parallelogram. The outer perimeter surface of the PCB mounting platform can be flat or substantially flat to allow for the mounting of one or more LEDss thereon. The sides of the PCB mounting platform can be equal in length, or alternatively, one or more sides of the PCB mounting platform can have a different length from the other remaining sides. The PCB mounting platform can be made of any metal or metal alloy and can also function as a heat sink.

One or more LEDs of a LED module 270 can be coupled to one or more portions (e.g., the outer perimeter) of the PCB mounting platform. In certain example embodiments, an LED is coupled to a side of the PCB mounting platform, such that, for example, in a hexagon-shaped platform, six LEDs can be coupled, one to each of the six sides of the platform. As another example, for an octagon-shaped platform, eight LEDs can be coupled, one to each of the eight sides of the platform. In certain example embodiments, at least one side of the outer surface of the PCB mounting platform is angled such that it is non-parallel and non-normal to the sides of the wave guide 150 to generally direct additional light emitted by the LEDs disposed thereon towards one of the outer edges of the wave guide 150. The LEDs of a LED module 270 can be in thermal communication with the PCB mounting platform and transfer heat to the PCB mounting platform through conduction.

An example LED module 270 can include a PCB and one or more LEDs electrically coupled to the PCB. Alternatively, discrete LEDs or chip-on-board LEDs could be used. The PCB can be electrically coupled to the LED driver 210 or other power source through electrical coupling. In addition, a single LED module 270 or multiple LED modules 270 can be provided. The LEDs of the LED modules 270 can be disposed on one or more substrates (e.g., PCBs), where each substrate can be rigid (e.g., planar, three-dimensional) or flexible. A flexible substrate can wrap around or otherwise be disposed on some or all of the upper portion of the heat sink 180. In any case, the LED modules 270 can be positioned so that, when illuminated, the light emitted by the LEDs is directed toward the outer perimeter of the wave guide 150.

For the LED modules 270 to operate, power and/or control is delivered from the LED driver 210 to the LED modules 270. In certain example embodiments, the power and/or control is delivered to the LED modules 270 from the LED driver 210 using one or more conductors (not shown). A conductor can carry voltage, current, or a combination thereof. In addition, each conductor can be a wire, a cable, or some other medium that can carry a voltage and/or current therethrough. A conductor can be made of an electrically conductive material (e.g., copper, aluminum) and, in some cases, can have one or more electrically non-conductive materials (e.g., rubber, nylon, plastic) wrapped around the electrically conductive material. The electrically conductive material of the conductor can be one of a number of sizes (e.g., 22 American wire gauge (AWG), 18 AWG, 16 AWG) that allow the conductor to carry the voltage and/or current required to operate the LED modules 270.

The conductors can be run through one or more apertures in one or more components of the center-fired waveguide LED light fixture 200 to electrically couple the LED driver 210 to the LED modules 270. For example, if the LED driver 210 is mounted on top of the mounting plate 220, the conductors can be run through aperture 225, 223, and/or 224 in the mounting plate 220. The conductors can also be run through one or more apertures 237 in the sealing plate 130. Further, if needed, the conductors can be run through the aperture 242 in the reflector and/or the aperture 253 in the wave guide 150. Alternatively, or in addition, the voltage and/or control can be sent between the LED driver 210 and the LED modules 270 using wireless technology.

One or more components of the waveguide LED light fixture 200 can have a slight air gap (separation) between it and another component to allow one or more conductors to pass therethrough. In addition, or in the alternative, one or more of the apertures 237 in the sealing plate 130 can be used to receive one or more fastening devices 233 (e.g., screws, bolts) that traverse the heat sink 180 and mechanically couple the heat sink 180 to the sealing plate 130.

FIGS. 3A-3E show various views of an alternative example center-fired waveguide LED light fixture 300 in accordance with certain example embodiments. In this case, the example center-fired waveguide LED light fixture 300 is configured to mount within a recessed luminaire. In one or more embodiments, one or more of the components shown in FIGS. 3A-3E may be omitted, repeated, and/or substituted. Accordingly, embodiments of a center-fired waveguide LED light fixture should not be considered limited to the specific arrangement of components shown in FIGS. 3A-3E.

The center-fired waveguide LED light fixture 300 of FIGS. 3A-3E is substantially the same as the center-fired waveguide LED light fixture 200 in FIGS. 1A-2, except as described below. The description for any component (e.g., mounting plate 320, wave guide 350) of FIGS. 3A-3E not provided below can be considered substantially the same as the corresponding component (e.g., mounting plate 220, wave guide 150) described above with respect to FIGS. 1A-2. The numbering scheme for the components of FIGS. 3A-3E parallels the numbering scheme for the components of FIGS. 1A-2 in that each component is a three digit number, where similar components between the center-fired waveguide LED light fixture 300 and the center-fired waveguide LED light fixture 200 have the identical last two digits.

Referring to FIGS. 1A-3E, the mounting plate 320 includes a number of apertures (e.g., aperture 324, aperture 325) that traverse the surface 321 of the mounting plate 320. Such apertures in the mounting plate 320 can have the same and/or different dimensions (e.g., shape, width, length) as the apertures in the mounting plate 220 of FIG. 2. For example, apertures 324 in the mounting plate 320 are shown having a different shape and size compared to the shape and size of the apertures 224 in the mounting plate 220.

The apertures in the mounting plate 320 can serve the same purpose as the apertures in the mounting plate 220 of FIG. 2. For example, aperture 325 can be used, in conjunction with one or more fastening devices (in this case, a screw 382 and a nut 384), to mechanically and adjustably couple a bracket 388 to the top surface 321 of the mounting plate 320. In addition, or in the alternative, an aperture (hidden from view by fastening device 327) in the mounting plate 320 can be used to receive the fastening device 327, which can mechanically couple the mounting plate 320 to the base 330, the heat sink 380, and/or one or more other components of the waveguide LED light fixture 300.

Mechanically coupled to each bracket 388 in FIGS. 3A-3E is a torsion spring 322. The torsion spring 322 can be secured to the bracket 388 using one or more of a number of fastening features 386, including but not limited to a screw, a pin, a slot, solder, and a bolt. In certain example embodiments, the torsion spring 322 can be replaced by some other feature and/or device that mechanically couples to a feature of a junction box, recessed luminaire, or other mounting surface. In such a case, the other feature and/or device can secure the waveguide LED light fixture 300 within the junction box.

The trim 360 of the waveguide LED light fixture 300 has several different features compared to the trim 160 of FIGS. 1A-2. For example, the bottom edge 364 of the trim 360 can be wider than the bottom edge 164 of the trim 160. In this case, the width 315 of the bottom edge 364 of the trim 360 can be approximately 0.935 inches, where the width of the bottom edge 164 of the trim 160 can be approximately 0.33 inches. Because the shape of the trim 360 shown in FIGS. 3A-3E is substantially circular and because the diameter 314 of the trim 360 is approximately 7.25 inches, both of which are similar to the corresponding features of the trim 160, the diameter 313 of the inner perimeter of the bottom edge 364 can be approximately 5.38 inches. As a result, less of the wave guide 350 is exposed compared to the wave guide 150 of the waveguide LED light fixture 200.

In addition, the trim 360 can have a wall 365 that extends substantially vertically away from a back surface 369 of the bottom edge 364. The height 366 of this wall 365 (when added to the minimal height of the bottom edge 364) can be approximately 0.740 inches. The diameter 312 of the bottom end of the substantially circular heat sink 380 can be approximately 2.0 inches, which is similar in size and shape of the bottom end of the heat sink 180 of the waveguide LED light fixture 200.

Unlike the cover plate 190 of FIGS. 1A-2, the cover plate 390 of FIGS. 3A-3E is shown without vent holes. Otherwise, the cover plate 390 (including the outer surface 392) can have the same shape and/or size as the cover plate 190.

FIG. 4 shows an exploded perspective bottom-side view of an alternative example center-fired waveguide LED light fixture 400 of FIGS. 3A-E in accordance with certain example embodiments. The center-fired waveguide LED light fixture 400 of FIG. 4 is substantially the same as the center-fired waveguide LED light fixture 200 in FIGS. 1A-2, except as described below. The description for any component (e.g., mounting plate 320, wave guide 350) of FIG. 4 not provided below can be considered substantially the same as the corresponding component (e.g., mounting plate 220, wave guide 150) described above with respect to FIGS. 1A-2. The numbering scheme for the components of FIG. 4 parallels the numbering scheme for the components of FIGS. 1A-2 in that each component is a three digit number, where similar components between the center-fired waveguide LED light fixture 400 and the center-fired waveguide LED light fixture 200 have the identical last two digits.

Referring to FIGS. 1A-4, in place of the sealing plate 130 in FIGS. 1A-2, the example center-fired waveguide LED light fixture 400 of FIG. 4 includes a base 330. The base 330 can have a substantially flat upper surface (hidden from view) and an aperture (hidden from view) in the approximate center of the base 330 to align with the aperture in the approximate center of the mounting plate 320. Each of these components can have more than one aperture, and each of these apertures can be disposed at any point on its respective component, provided that the apertures can align with each other. In such a case, one or more fastening devices 327 can traverse both the mounting plate 320 and the base 330 to mechanically couple the mounting plate 320 to the base 330.

The base 330 can be shaped substantially similar (but in the inverse) to the trim 360 in that the base 330 can include a back surface 439 of the top edge of the base 330. In addition, the base 330 can have a outer wall 435 that extends substantially vertically away from the back surface 439 of the top edge of the base 330. The length of the perimeter of the outer wall 435 of the base 330 can be less than the length of the perimeter of the top edge of the base 330. In addition, or in the alternative, the length of the perimeter of the outer wall 435 of the base 330 can be less than the length of the perimeter of the wall 365 of the trim 360. In such a case, because the base 330 is inverted relative to the trim 360, the outer wall 435 of the base 330 can fit within the wall 365 of the trim 360. The height of the base 330 can be such that, when the base 330 is disposed within the trim 360, the top edge of the base 330 can sit substantially flush with the end of the wall 365 of the trim 360. The perimeter of the top edge of the base 330 can be slightly less than or slightly greater than the inner perimeter of the wall 365 of the trim 360.

The base 330 can be similar to the sealing plate 130 in that the base 330 can include a number of protrusions 432 that extend outward along one or more sides of the base 330. Such protrusions 432 can correspond in number, shape, depth, etc., with receiving features 461 (e.g., bosses with threaded apertures) disposed along the inner surface 469 of the wall 365 of the trim 360. In such a case, one or more fastening devices 434 (e.g., a screw) can extend through an aperture that traverses a protrusion 432 and at least partially traverses an aperture 444 in the reflector 440. In addition, or in the alternative, other coupling features can be used to mechanically couple the base 330 to the trim 360. In certain example embodiments, when the length of the perimeter of the wave guide 350 is approximately the same as or greater than the length of the perimeter of the reflector 440, the fastening devices 434 can also extend through an aperture in the wave guide 350 that corresponds to the apertures 444 in the reflector 440. In addition, as with the reflector 240 of FIG. 2, the reflector 440 of FIG. 4 has an aperture 442, larger than apertures 444, that traverse the center portion of the reflector 440. The aperture 442 can align with the top portion of the heat sink 380. For example, the aperture 442 of the reflector 440, as well as the aperture 453 of the wave guide 350, can be positioned substantially in the center of the reflector 440 and the wave guide 350, respectively. In such a case, aperture 442 and aperture 453 can have substantially the same shape as the top portion of the heat sink 380 and be of a perimeter that is slightly larger than the perimeter of the heat sink 380 with the LED modules 470 coupled thereto.

In addition, or in the alternative, the features shown disposed on the back surface 369 of the bottom edge 364 inside the inner surface 469 of the wall 365 of the trim 360 can be receiving posts 461. In such a case, the receiving posts 461 can receive the fastening devices 434 and allow the base 330 to be mechanically coupled to the trim 360. Further, in such a case, the length of the perimeter of the inner edge of the back surface 369 is less than the length of the perimeter of the inner surface 469 of the wall 365.

In certain example embodiments, inside the outer wall 435 of the base 330 can be disposed one or more of a number of dividing walls 495. Each dividing wall 495 can have a height that is substantially the same as (or less than) the height of the outer wall 435. Further each dividing wall 495 can extend from the outer wall 435 toward an inner wall 497, which likewise has a height that is substantially the same as (or less than) the height of the outer wall 435. Alternatively, one or more dividing walls 495 can extend in some direction other than toward the inner wall 497. When there are multiple dividing walls 495, the spacing of such dividing walls 495 can vary, creating one or more compartments (e.g., compartment 490, compartment 491).

In certain example embodiments, one or more of a number of components of the center-fired waveguide LED light fixture 400 can be placed inside of a compartment. For example, the LED driver 410 can be mounted inside a larger compartment 490 that has enough space to fit the LED driver 410. In addition, or in the alternative, smaller compartments 491 may not contain any components of the center-fired waveguide LED light fixture 400, but rather can be used as an additional heat sink to transfer heat generated by the LED driver 410 and/or the LED modules 470 outside the center-fired waveguide LED light fixture 400.

The LED driver 410, like the LED driver 210 in FIG. 2, can be enclosed, directly and/or by one or more components of the waveguide LED light fixture 400, so that none of the components of the LED driver 410 is exposed outside of the waveguide LED light fixture 400. The inner wall 497 of the base 330 can form a cavity 492 that can be of sufficient size to allow a top portion of the heat sink 380 and/or the LED modules 470 to fit inside the cavity when the base 330 is mechanically coupled to the trim 360.

Figure 5A:
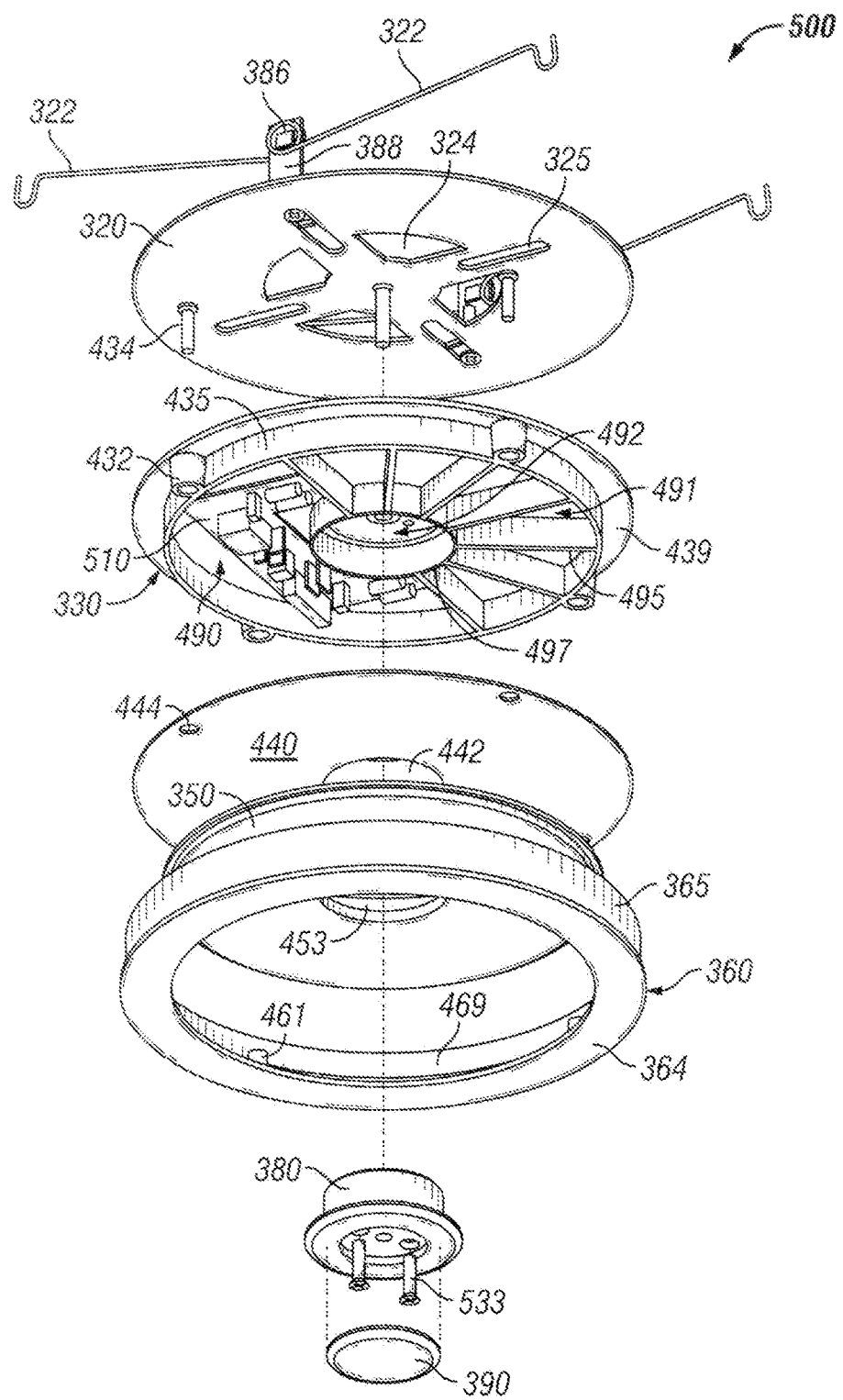
FIGS. 5A and 5B each show an exploded perspective bottom-side view of another alternative example center-fired waveguide LED light fixture in accordance with certain example embodiments.
Figure 5B:
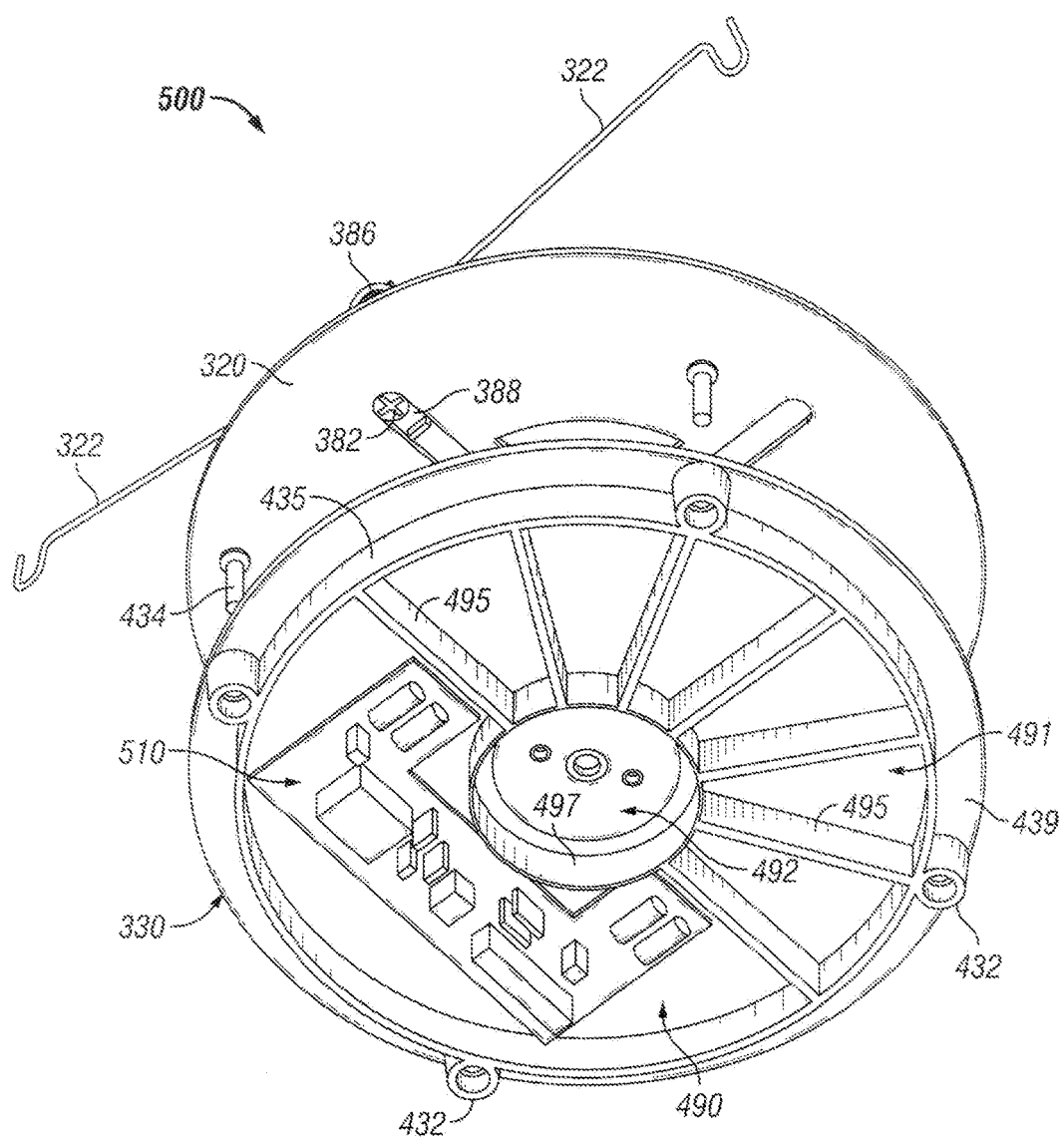

FIGS. 5A and 5B each show an exploded perspective bottom-side view of another alternative example center-fired waveguide LED light fixture 500 in accordance with certain example embodiments. Referring to FIGS. 1A-5B, the components of FIGS. 5A and 5B are substantially similar to the corresponding components of FIGS. 3A-4, except that the LED driver 510 has no covering. When the base 330 is mechanically coupled to the trim 360 and when the LED driver 510 is mounted inside a larger compartment 490, the LED driver 510 is enclosed within the compartment 490. In other words, there is no risk in having the components of the LED driver 510 exposed (without a cover) because the LED driver 510 cannot be accessed unless power is no longer fed to the LED driver 510. As such, by not having the LED driver 510 encased, the components of the LED driver 510 that generate heat can have the heat dissipated more efficiently by the body 330 and/or the heat sink 380.

Figure 6A:
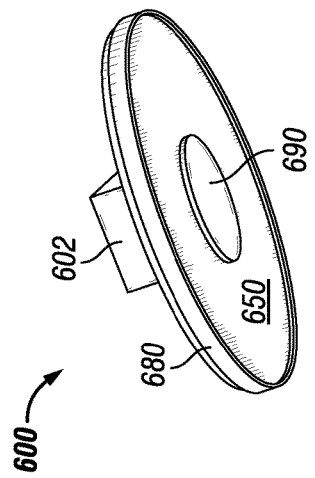
FIGS. 6A-6C show various views of yet another alternative example center-fired waveguide LED light fixture in accordance with certain example embodiments.
Figure 6B:
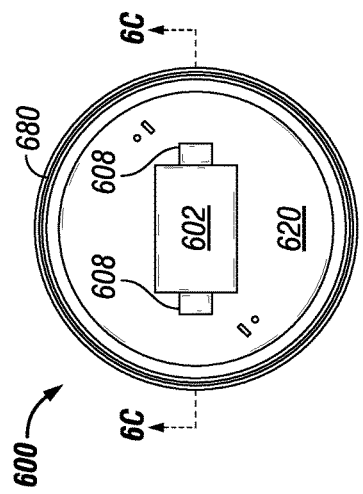
Figure 6C:
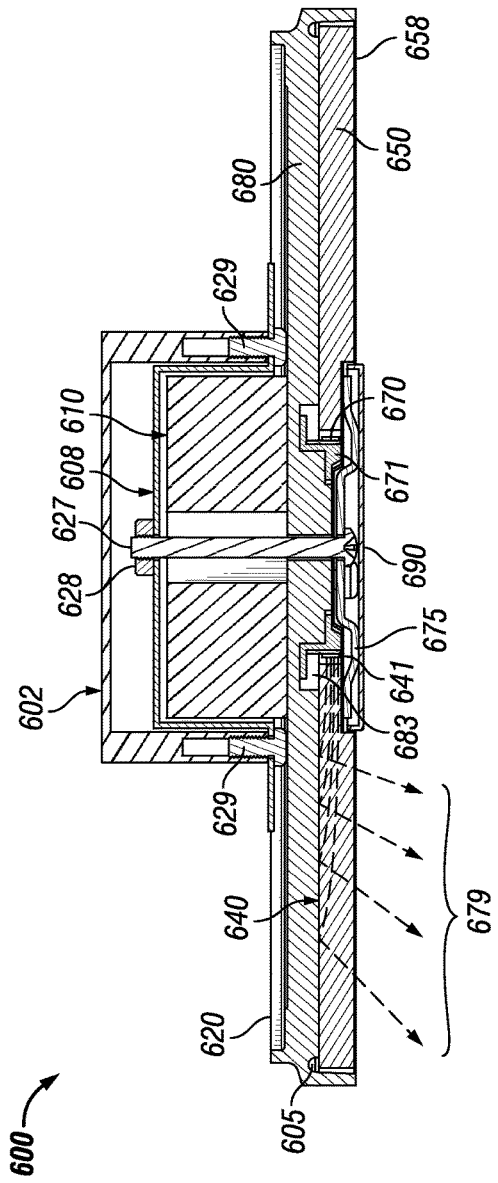

FIGS. 6A-6C show various views of yet another alternative example center-fired waveguide LED light fixture 600 in accordance with certain example embodiments. In one or more embodiments, one or more of the components shown in FIGS. 6A-6C may be omitted, repeated, and/or substituted. Accordingly, embodiments of a center-fired waveguide LED light fixture should not be considered limited to the specific arrangement of components shown in FIGS. 6A-6C.

The center-fired waveguide LED light fixture 600 of FIGS. 6A-6C is substantially the same as one or more of the center-fired waveguide LED light fixtures FIGS. 1A-5B, except as described below. The description for any component of FIGS. 6A-6C not provided below can be considered substantially the same as a corresponding component described above with respect to FIGS. 1A-5B. The numbering scheme for the components of FIGS. 6A-6C parallels the numbering scheme for the components of FIGS. 1A-5B in that each component is a three digit number, where similar components between the center-fired waveguide LED light fixture 600 and one of the above-discussed center-fired waveguide LED light fixtures have the identical last two digits.

Referring to FIGS. 1A-6C, in this example embodiment, the heat sink 680 is combined with, and is shaped similarly to, the body of FIGS. 4-5B. Specifically, the heat sink 680 is elongated and, in this example, substantially circular. The outer edge of the heat sink 680 along its perimeter extends downward, away from the rest of the heat sink 680, to receive the wave guide 650.

The heat sink 680 has one or more of a number of other features that allow the various components of the waveguide LED light fixture 600 to be coupled together. For example, the heat sink 680 can have a channel into which a sealing member 605 is inserted. The channel (hidden from view by the sealing member 605) can be located in one or more locations on the heat sink 680. In this case, the channel is located along the inner surface where the outer extension of the heat sink 680 begins. The channel can be continuous (in this case, for example, forming a loop around the heat sink 680) or be in one or more discrete segments.

Another example feature of the heat sink 680 is a slot 683 that traverses radially around some or all of the heat sink 680. The slot 683 can receive one or more of a number of components. In this example, the slot 683 receives one end of a thermally conductive electrical insulator 671. The other end of the thermally conductive electrical insulator 671 can extend below the heat sink 680 to the wave guide 650. In such a case, the LED modules 670 can be coupled to a portion of the thermally conductive electrical insulator 671 so that the LED modules 670 can direct light 679 through the wave guide 650, and heat generated by the LED modules 670 can be absorbed by the thermally conductive electrical insulator 671.

In certain example embodiments, there can be one or more reflectors in the waveguide LED light fixture 600. In this example, an upper reflector 640 is disposed between the heat sink 680 and the wave guide 650. In addition, a lower reflector 641 can be disposed between a retainer plate 675 and the wave guide 650. The retainer plate 675 can be made from one or more of a number of materials and have one or more of a number of shapes and/or dimensions. Specifically, in this case, the upper reflector 640 and the lower reflector 641 can be used to direct the light 679 emitted by the LED modules 670 out of the bottom surface 658 of the wave guide 650.

The retainer plate 675, with the aid of one or more fastening devices (e.g., fastening device 627, fastening device 628), is used to hold all of the various components of the waveguide LED light fixture 600 together. In this case, one such fastening device 627 is a screw that traverses the retainer plate 675, the heat sink 680, the LED driver 610, and the mounting bracket 608. Another such fastening device 628 is a nut, that mechanically couples to the screw using mating threads. In some cases, there are no fastening devices, and instead one or more components (e.g., the retainer plate 675, the heat sink 680) of the waveguide LED light fixture 600 can have one or more coupling features (e.g., mating threads, slots, tabs) that allow one component to mechanically couple to another component of the waveguide LED light fixture 600.

The retainer plate 675 can extend radially outward at least beyond an aperture (hidden from view) in the wave guide 650, and so makes contact with a portion of the wave guide 650. This portion of the wave guide 650 can be recessed so that the bottom of the retainer plate 675 is substantially flush with the bottom of the rest of the wave guide 650. The retainer plate 675 can be covered by a cover plate 690. The cover plate 690 can mechanically couple to the wave guide 650 and/or the retainer plate 675. The mechanical coupling of the cover plate 690 to the wave guide 650 and/or the retainer plate 675 can involve the use of one or more of a number of coupling methods, including but not limited to mating threads, magnetism (as when the cover plate 690 includes a magnet of one polarity and the retainer plate 675 includes a magnet of an opposite polarity), clips, compression fittings, fusion, slots, and fastening devices. The cover plate 690 can be used for purely aesthetic purposes, or the cover plate 690 can have some practical attributes, such as acting as an additional heat sink.

Mounted to the top surface of the mounting plate 620 is the mounting bracket 608. The mounting bracket 608 is a component that secures the LED driver 610 to the top of the mounting plate 620. The mounting bracket 608 can be any shape and/or size. Further, the mounting bracket 608 can be made of any suitable material. In this example, the mounting bracket 608 is u-shaped with portions that extend perpendicularly outward toward the ends. These portions can have one or more apertures through which a fastening device 629 can extend.

Fitted over the mounting bracket 608 and mounted on top of the protrusions of the mounting bracket 608 is a junction box 602. The junction box 602 can be part of an original fixture and/or can be used as a mounting structure for one of a variety of fixtures. The junction box 602 can have one or more walls, each of which can have a cavity for receiving the fastening device 629. In such a case, the fastening device 629 can protrude through the mounting plate 620, the mounting bracket 608, and into at least part of the cavity in the walls of the junction box 602. The junction box 602 can be of any size and/or shape, and can be made of one or more of a number of suitable materials (e.g., plastic, metal, ceramic). The junction box 602 can be tall enough to allow a proper air gap between the bottom surface of the top of the junction box 602 and the top of the mounting bracket 608 to provide enough air for heat from the LED driver 610 to dissipate.

The junction box 602 can include one or more of a number of other features (not shown) to allow the waveguide LED light fixture 600 to be mounted to a junction box, a recessed luminaire, and/or some other receptacle to which the waveguide LED light fixture 600 can be mounted.

Figure 7B:
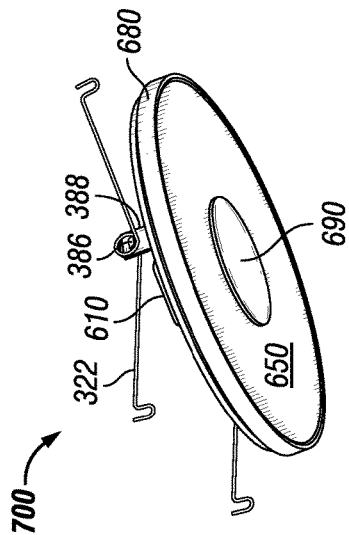
FIGS. 7A-7C show various views of still another alternative example center-fired waveguide LED light fixture in accordance with certain example embodiments.
Figure 7A:
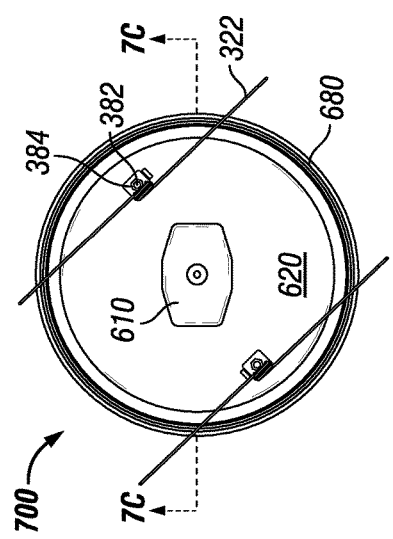
Figure 7C:
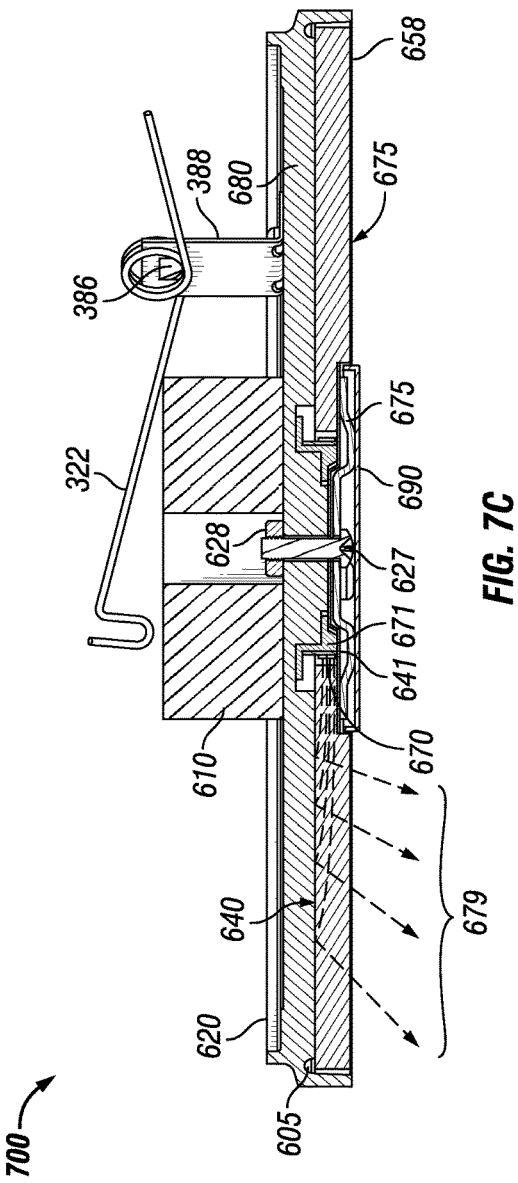

FIGS. 7A-7C show various views of still another alternative example center-fired waveguide LED light fixture 700 in accordance with certain example embodiments. In one or more embodiments, one or more of the components shown in FIGS. 7A-7C may be omitted, repeated, and/or substituted. Accordingly, embodiments of a center-fired waveguide LED light fixture should not be considered limited to the specific arrangement of components shown in FIGS. 7A-7C.

The center-fired waveguide LED light fixture 700 of FIGS. 7A-7C is substantially the same as one or more of the center-fired waveguide LED light fixtures FIGS. 1A-6C, except as described below. The description for any component of FIGS. 7A-7C not provided below can be considered substantially the same as a corresponding component described above with respect to FIGS. 1A-6C. The numbering scheme for the components of FIGS. 7A-7C parallels the numbering scheme for the components of FIGS. 1A-6C in that each component is a three digit number, where similar components between the center-fired waveguide LED light fixture 700 and one of the above-discussed center-fired waveguide LED light fixtures have the identical last two digits.

Referring to FIGS. 1A-7C, the waveguide LED light fixture 700 does not include the mounting bracket 608 and the junction box 602 of FIGS. 6A-6C. Further, mounting features, which includes torsion springs 322, brackets 388, and fastening features 386 substantially similar to those described above with respect to FIGS. 3A-5B, are shown with the waveguide LED light fixture 700.

Retrofitting existing fixtures with, or installing new fixtures using, example embodiments of waveguide LED light fixtures allows a user to replace at least a lens and light source of an existing fixture to provide a waveguide LED light source using an existing recessed luminaire, junction box, or other base (mounting structure). By retrofitting existing fixtures using certain example embodiments, most or all of an existing fixture except for, in some cases, the mounting structure (base) can be replaced to provide a different look to the light fixture without complicated electrical and/or mechanical manipulation or expertise. In other words, many issues common to retrofitting and/or installing a lighting fixture (e.g., rewiring, drilling new holes, repairing a surface, hiring an electrician, buying an entirely new fixture) can be avoided or minimized. Using example embodiments described herein, the light fixture can be more energy efficient, provide particular types of lighting, and be easily changed at some point in the future.

In addition, the profile (e.g., height) of the example light fixtures herein create positive aesthetics. Further, by enabling the LED driver to be mounted inside example embodiments of the light fixture or in a location remote from the light fixture, a number of space concerns and safety concerns can be mitigated. Further, example embodiments allow for easier compliance with various electrical codes and standards that can apply.

Accordingly, many modifications and other embodiments set forth herein will come to mind to one skilled in the art to which retrofitting existing fixtures with, or installing new fixtures using, waveguide LED light fixtures pertain having the benefit of the teachings presented in the foregoing descriptions and the associated drawings. Therefore, it is to be understood that retrofitting existing fixtures with, or installing new fixtures using, waveguide LED light fixtures is not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A light-emitting diode (LED) light fixture, comprising:
    a wave guide having an aperture that traverses therethrough and an outer perimeter disposed opposite the aperture;
    at least one LED disposed within the aperture in the wave guide, wherein the at least one LED emits light through the aperture in the wave guide toward the outer perimeter of the wave guide, wherein the light emitted by the at least one LED is directed through a bottom surface of the wave guide between the aperture and the outer perimeter;
    a LED driver electrically coupled to the at least one LED;
    a heat sink disposed adjacent to a top surface of the wave guide and thermally coupled to the at least one LED, wherein the heat sink comprises a portion that receives the outer perimeter of the wave guide;
    an electrical insulator that abuts against and is disposed between the at least one LED and the heat sink, wherein the electrical insulator comprises thermally conductive material;
    a retainer plate that supports the wave guide, the electrical insulator, the at least one LED, and the heat sink, wherein the retainer plate directly abuts against, at least, the bottom surface of the wave guide and is mechanically coupled to the electrical insulator;
    a mounting plate comprising at least one mounting feature, wherein the mounting plate is mechanically coupled to the heat sink; a mounting bracket disposed atop and coupled to the mounting plate, wherein the LED driver is secured atop the heat sink by the mounting bracket; and
    a first fastening device that traverses the retainer plate, the aperture in the waveguide, the heat sink, the LED driver, and the mounting bracket.

2. The LED light fixture of claim 1, further comprising:
    a junction box disposed atop the mounting plate, wherein the junction box comprises at least one wall that forms a cavity, inside of which are disposed the LED driver and at least a portion of the mounting bracket.

3. The LED light fixture of claim 2, further comprising:
    a second fastening device that traverses the mounting bracket and is disposed within the at least one wall of the junction box.

4. The LED light fixture of claim 1, wherein the electrical insulator is disposed, in part, in a slot formed within the heat sink.

5. The LED light fixture of claim 1, further comprising:
    a first reflector disposed between the wave guide and the heat sink.

6. The LED light fixture of claim 5, further comprising:
    a second reflector disposed between the retainer plate and the wave guide.

7. The LED light fixture of claim 1, wherein the aperture and the at least one LED are positioned toward a center of the wave guide and emits the light toward an outer perimeter of the wave guide before the light is directed through the bottom surface of the wave guide.

8. The LED light fixture of claim 7, wherein a portion of a perimeter of the heat sink is disposed within the aperture in the wave guide.

9. The LED light fixture of claim 8, wherein at least a portion of the electrical insulator is disposed within the aperture in the wave guide adjacent to the heat sink.

10. The LED light fixture of claim 9, wherein the at least one LED is disposed on a mounting board of a LED module, wherein the mounting board comprises a flexible substrate and wraps around the portion of the electrical insulator opposite the heat sink.

11. The LED light fixture of claim 1, further comprising:
    a cover plate that covers an outer surface of the retainer plate.

12. The LED light fixture of claim 1, further comprising:
    a sealing member disposed within a channel of the heat sink adjacent to the outer perimeter of the wave guide.

13. The LED light fixture of claim 1, wherein the bottom surface of the wave guide comprises a recessed area adjacent to the aperture, wherein the retainer plate is disposed within recessed area, and wherein a bottom of the retainer plate is substantially flush with a remainder of the bottom surface of the wave guide.

14. A light-emitting diode (LED) light fixture, comprising: a wave guide having an aperture that traverses therethrough and an outer perimeter disposed opposite the aperture;

at least one LED disposed within the aperture in the wave guide, wherein the at least one LED emits light through the aperture in the wave guide toward the outer perimeter of the wave guide, wherein the light emitted by the at least one LED is directed through a bottom surface of the wave guide between the aperture and the outer perimeter;

a LED driver electrically coupled to the at least one LED;

a heat sink disposed adjacent to a top surface of the wave guide and thermally coupled to the at least one LED, wherein the heat sink comprises a portion that abuts against receives the bottom surface outer perimeter of the wave guide;

an electrical insulator that abuts against and is disposed between the at least one LED and the heat sink, wherein the electrical insulator comprises thermally conductive material; and a retainer plate that supports the wave guide, the electrical insulator, the at least one LED, and the heat sink, wherein the retainer plate directly abuts against, at least, the bottom surface of the wave guide and is mechanically coupled to the electrical insulator, wherein the electrical insulator comprises a first portion and a second portion, wherein the first portion is disposed within a slot in the heat sink between the heat sink and the wave guide, and wherein the second portion abuts against the at least one LED.

15. The LED light fixture of claim 14, wherein the electrical insulator further comprises a third portion, wherein the third portion is disposed between the heat sink and the retainer plate.

16. The LED light fixture of claim 15, wherein the electrical insulator further comprises a fourth portion, wherein the fourth portion abuts against a reflector.

* * * * *